US011018595B1

(12) United States Patent
Kuchipudi et al.

(10) Patent No.: US 11,018,595 B1
(45) Date of Patent: May 25, 2021

(54) SECONDARY CONTROLLED AC-DC CONVERTER AND METHODOLOGY FOR LOW FREQUENCY OPERATION

(71) Applicant: Cypress Semiconductor Corporation, San Jose, CA (US)

(72) Inventors: Pavan Kumar Kuchipudi, San Jose, CA (US); Myeongseok Lee, Campbell, CA (US); Rashed Ahmed, Fremont, CA (US); Murtuza Lilamwala, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/027,434

(22) Filed: Sep. 21, 2020

Related U.S. Application Data

(60) Provisional application No. 62/950,430, filed on Dec. 19, 2019.

(51) Int. Cl.
*H02M 3/335* (2006.01)
*H02M 1/08* (2006.01)
*H02M 1/00* (2006.01)

(52) U.S. Cl.
CPC ......... *H02M 3/33592* (2013.01); *H02M 1/08* (2013.01); *H02M 2001/0009* (2013.01)

(58) Field of Classification Search
CPC ............... H02M 3/33592; H02M 1/08; H02M 2001/0009
See application file for complete search history.

(56) References Cited

U.S. PATENT DOCUMENTS

| | | | |
|---|---|---|---|
| 6,888,108 B2* | 5/2005 | Carr ..................... | H05B 1/0227 219/483 |
| 8,908,393 B2 | 12/2014 | Ye et al. | |
| 9,755,529 B2* | 9/2017 | Chen ...................... | H02M 1/08 |
| 9,893,632 B2 | 2/2018 | Freeman et al. | |
| 9,991,806 B2 | 6/2018 | Gong | |
| 10,243,442 B1 | 3/2019 | Balakrishnan et al. | |
| 10,554,140 B1 | 2/2020 | Khamesra et al. | |
| 2009/0146632 A1 | 6/2009 | Julicher | |
| 2017/0155335 A1 | 6/2017 | Chang et al. | |
| 2017/0170656 A1 | 6/2017 | Greither | |
| 2019/0207522 A1* | 7/2019 | Sato ....................... | H02M 1/08 |

OTHER PUBLICATIONS

US 10,700,610 B1, 06/2020, Rai (withdrawn)

* cited by examiner

*Primary Examiner* — Kyle J Moody

(57) ABSTRACT

A secondary controlled AC-DC converter including an oscillator in a primary-side controller (PSC), and method for operating the same to enable soft-start and low frequency operation are provided. Generally, the method includes driving a power switch coupled between an AC input and a primary-side of the converter with a gate-drive (GD-signal). At startup and following auto-restart the GD-signal is generated using an oscillator-signal from the oscillator. After receiving start-stop pulses from a secondary-side controller, the oscillator-signal is decoupled from the GD-signal using a controller in the PSC, and the PSC begins generating the GD-signal using pulse-width-modulated (PWM) generated using the start-stop pulses. The oscillator operates at a first frequency independent of the PWM signal. The PWM signal includes one of a number of frequencies selected based on a power drawn from the converter, and, in low power applications can be less than the first frequency.

14 Claims, 8 Drawing Sheets

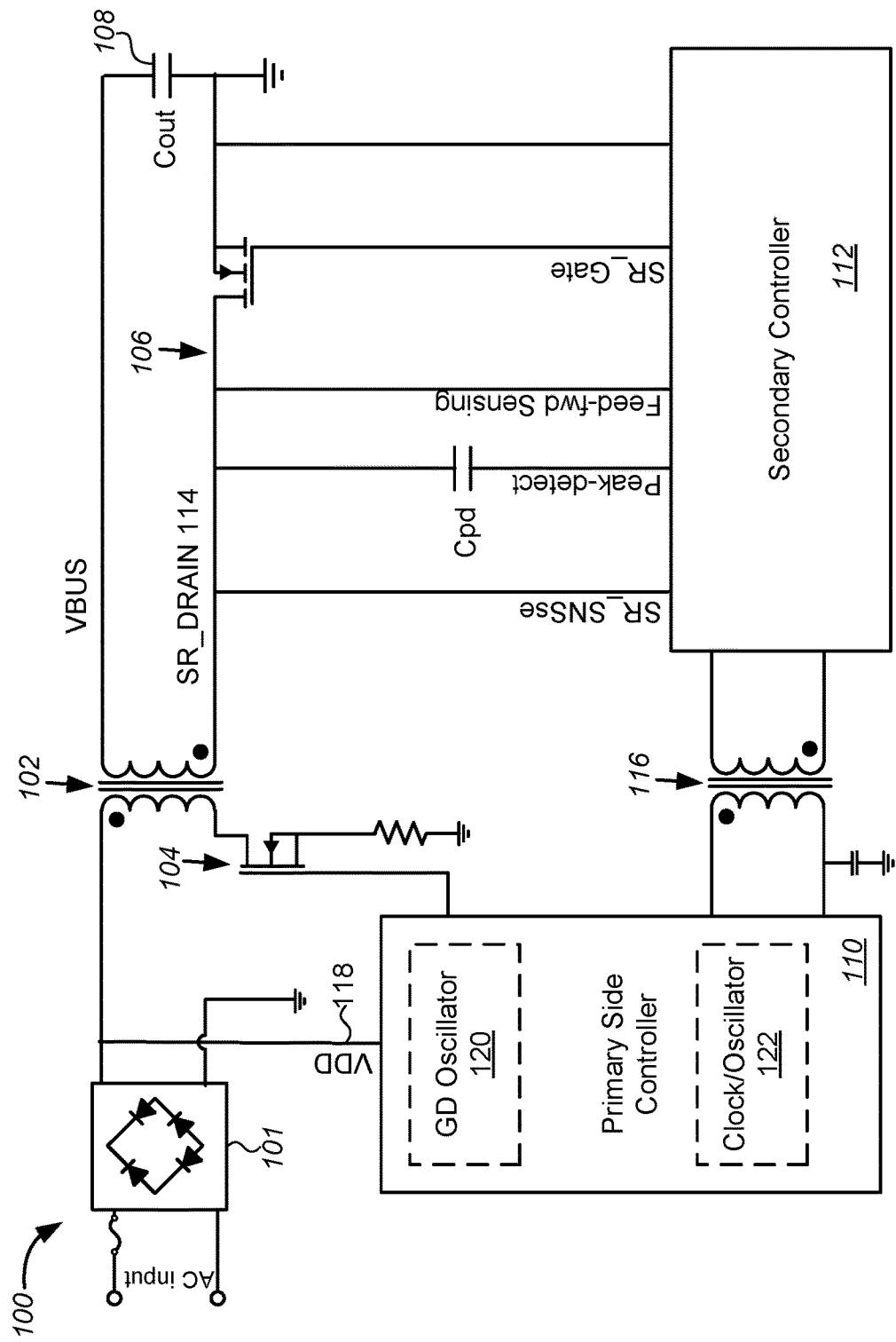
FIG. 1
(Conventional)

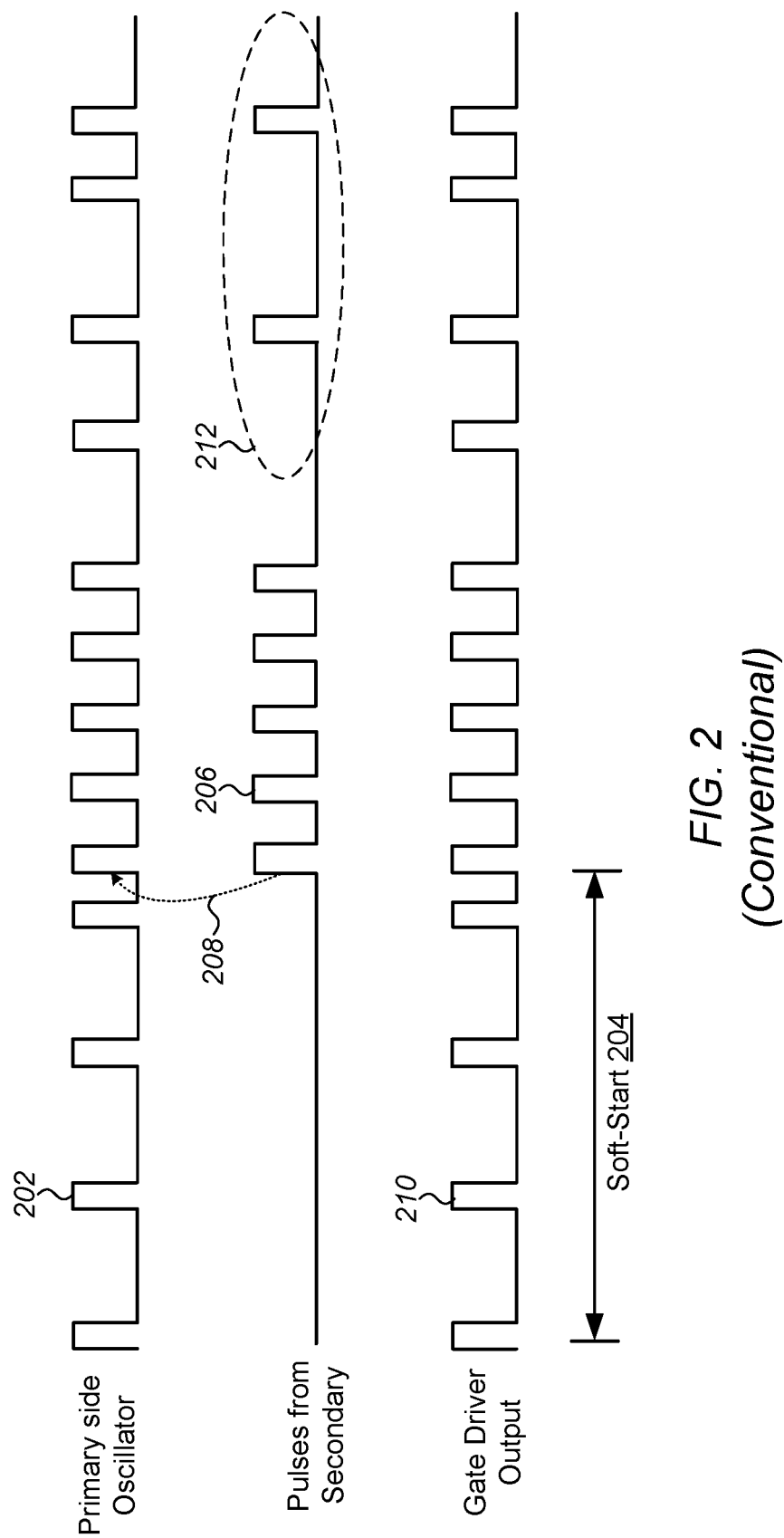
FIG. 2
(Conventional)

SECONDARY CONTROLLED AC-DC CONVERTER AND METHODOLOGY FOR LOW FREQUENCY OPERATION

CROSS-REFERENCE TO RELATED APPLICATIONS

This application is claims the benefit of priority under 35 U.S.C. 119(e) to U.S. Provisional Patent Application Ser. No. 62/950,430, filed Dec. 19, 2019, which is incorporated by reference herein in its entirety.

TECHNICAL FIELD

This disclosure relates generally to AC-DC converters, and more particularly to secondary-side controlled AC-DC converters including a primary-side oscillator and methods of operating the same to enable low frequency operation.

BACKGROUND

AC-DC converters convert power from an alternating current (AC) source to a direct current (DC) at a specified voltage level. AC-DC converters using secondary-side control can deliver power more efficiently for a given size and weight, and are therefore widely used in portable electronic devices. Generally, an AC-DC converter transfers power from an AC input connected or coupled to a primary-side of a transformer to a DC output coupled to a secondary-side of the transformer.

A simplified schematic block diagram of one such AC-DC converter including a synchronous rectifier (SR) sense architecture is shown in FIG. 1. Referring to FIG. 1 the AC-DC converter 100, generally includes a rectifying circuit, such as a bridge rectifier 101, coupled to a transformer 102 to rectify an AC input voltage, an active rectification element or power switch (PS), such as a PS field effect transistor (PS_FET 104) on a primary-side of the transformer, a synchronous rectifier (SR), such as a SR field effect transistor (SR_FET 106) on a secondary-side of the transformer, and an output filter or capacitor 108. In operation the PS_FET 104 switches power to the primary-side on or off in response to a signal from a primary-side controller 110. In secondary-side controlled converters, a secondary-side controller 112 coupled to a drain node (SR_DRAIN 114) and gate of the SR_FET 106 senses voltage on the SR_DRAIN and turns the SR_FET on and off in response to sensed voltage peaks, and negative and zero-crossings.

During regular operations following startup, the AC-DC converter 100 is said to be operating in flyback mode, and a magnetic field builds up in the transformer 102 while a current on the primary-side increases linearly. When the PS_FET 104 is off or opened, and SR_FET 106 is on or closed, the AC-DC converter 100 transfers the power to the secondary-side, in which the magnetic field begins to collapse and the secondary-side current decreases steadily, but gradually as power is given to the capacitor 108 connected to the output until a point is reached at which there is substantially zero current flow in the secondary. When operating in flyback mode the primary-side controller 110 receives a modulated pulse or signal from the secondary-side controller 112 through a pulse width modulation (PWM) transformer 116 to drive the PS_FET 104 using PWM. This feedback enables a frequency and/or duration of the pulses used to drive the PS_FET 104 to be determined by the secondary-side controller 112 based on the power drawn from the secondary-side.

During power-up of AC-DC converters 100 the primary-side controller 110 receives power directly from the bridge through a VDD pin 118, the secondary-side controller 112, which receives power from the secondary-side of the transformer 102, is not yet powered-up and therefore cannot generate the signals or pulses to drive the PS_FET 104 enabling power to be transferred to the secondary-side of the transformer 102. Referring to FIG. 2, to address this previous generations of flyback AC-DC converters 100 include a dedicated, primary-side or gate drive (GD) oscillator 120 and other pulse generating circuits in the primary-side controller 110 solely for the purpose of generating signals or pulses 202 to drive the PS_FET 104 at a predetermined fixed frequency and pulse duration during a soft-start 204 period or mode of operation. The soft-start 204 period continues until the secondary-side controller 112 is powered up and begins generating a modulated pulse 206, which are coupled to through the PWM transformer 116. Circuits in the primary-side controller 110 synchronize the pulses 202 from primary-side oscillator 120 with pulses 206 received from the secondary-side controller 112 as indicated by arrow 208, and generate a gate-driver output 210 to drive the PS_FET 104.

One problem with above architecture arises when, due to a low demand for power on the secondary-side, the frequency of pulses 206 received from the secondary-side controller 112 falls below the fixed frequency of the primary-side oscillator 120 as indicated by ellipse 212. This can occur, for example, when the AC-DC converter 100 is in a standby mode. It is noted that in conventional flyback AC-DC converters 100 the gate-driver output 210 always follows the pulses 202 from primary-side oscillator 120. Thus, the AC-DC converter 100 will operate with a gate-driver-output 210 at a higher frequency than necessary and less efficiently.

Another problem with above architecture is that the GD oscillator 120 is a dedicated solely to the purpose of generating signals or pulses 202 to drive the PS_FET 104, and the primary-side controller 110 must also include a separate oscillator or clock/oscillator 122 for generating clock signals at a fixed frequency to operate logic elements in the primary-side controller.

Accordingly, there is a need for an AC-DC converter capable of operating efficiently in flyback mode at lower frequencies not limited by a predetermined frequency of a dedicated oscillator in the primary controller. There is a further need for an AC-DC converter that does not require a dedicated primary-side oscillator for soft-start operations.

SUMMARY

Secondary controlled AC-DC converters with an independent oscillator in a primary-side controller (PSC), and method for operating the same are provided to enable soft-start and low frequency operation to improve efficiency. Generally, an oscillator-signal from the oscillator is also used as a clock signal to operate controller in the PSC to reduce cost, complexity and size of the converter while further improving efficiency.

In one embodiment, the method includes driving a power switch (PS) coupled between an AC input and a primary-side of the converter with a gate-drive (GD) signal. At startup and following auto-restart the GD-signal is generated using an oscillator signal from the oscillator. After receiving a pulse-width-modulated (PWM) signal from a secondary-side controller in the PSC, the oscillator signal is decoupled from the GD-signal using controller in the PSC, and the PWM signal is used to generate the GD-signal. The oscillator operates at a first frequency independent of the PWM signal. The PWM signal includes one of a number of frequencies selected based on a power drawn from the converter, and, in low power applications can be less than the first frequency.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

FIG. 1 is a schematic block diagram illustrating a conventional secondary controlled AC-DC converter;

FIG. 2 are timing diagrams showing typical waveforms of critical signals in primary-side controller (PSC) of a conventional secondary controlled AC-DC converter controlled by pulse width modulation (PWM) using pulses from a secondary-side controller (SSC);

DETAILED DESCRIPTION

Secondary controlled AC-DC converters with a primary-side controller (PSC) including an independent oscillator and controller to switch between an open-loop mode of operation using a gate-drive signal originating from the oscillator, and a close-loop mode using a pulse width modulation (PWM) signal or pulse from a secondary-side controller (SSC), and methods for operating the same are disclosed. The system and methods of the present disclosure are particularly useful in or with flyback AC-DC converters to reduce the cost, complexity and size of the converter while improving soft-start and low frequency operation to improve efficiency.

In the following description, for purposes of explanation, numerous specific details are set forth in order to provide a thorough understanding of the present invention. It will be evident, however, to one skilled in the art that the present invention may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. The term to couple as used herein may include both to directly electrically connect two or more components or elements and to indirectly connect through one or more intervening components.

Figure 3:
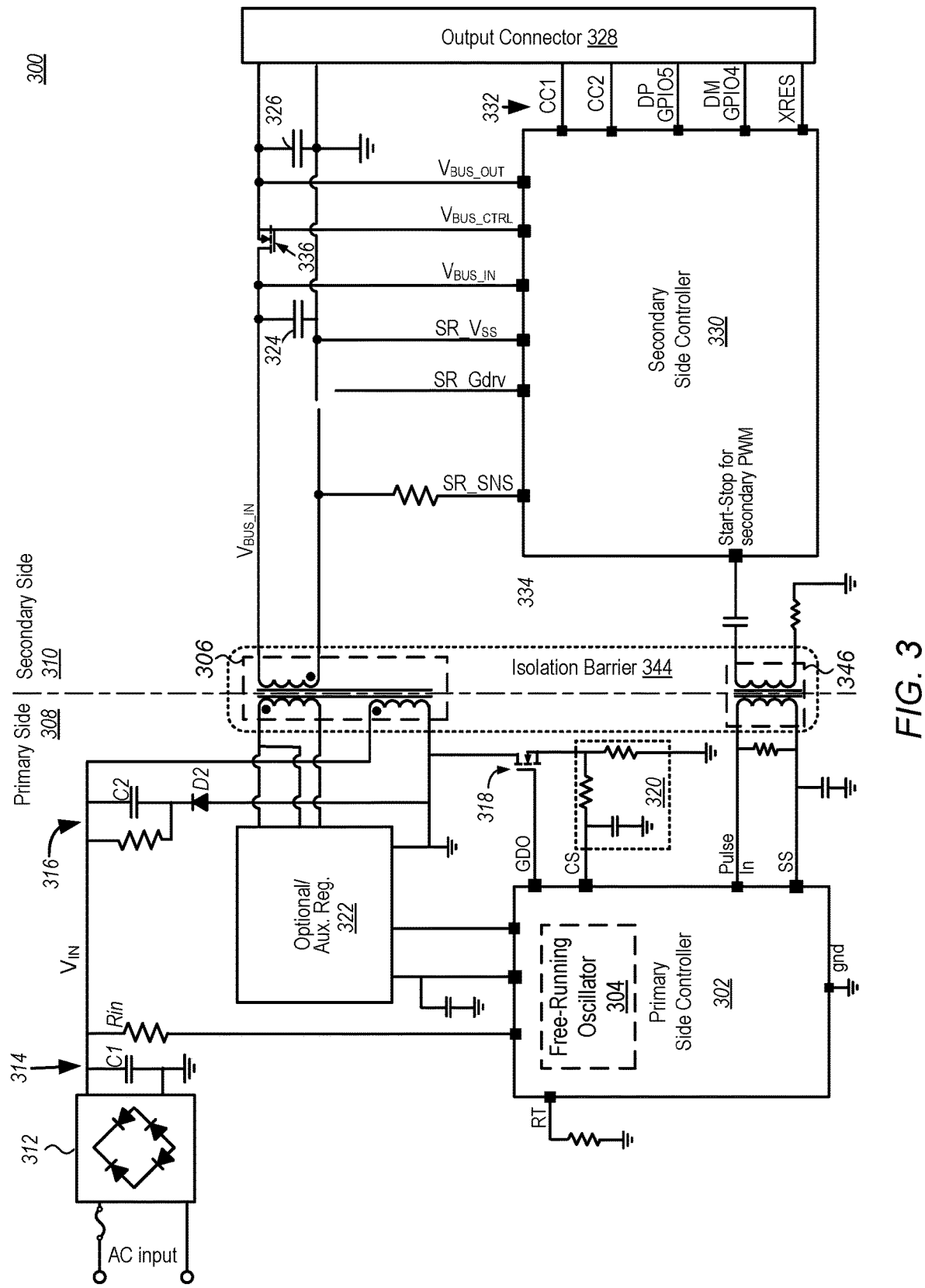
FIG. 3 is a schematic block diagram illustrating a secondary controlled AC-DC converter including an embodiment of a PSC with an independent oscillator.
Figure 4:
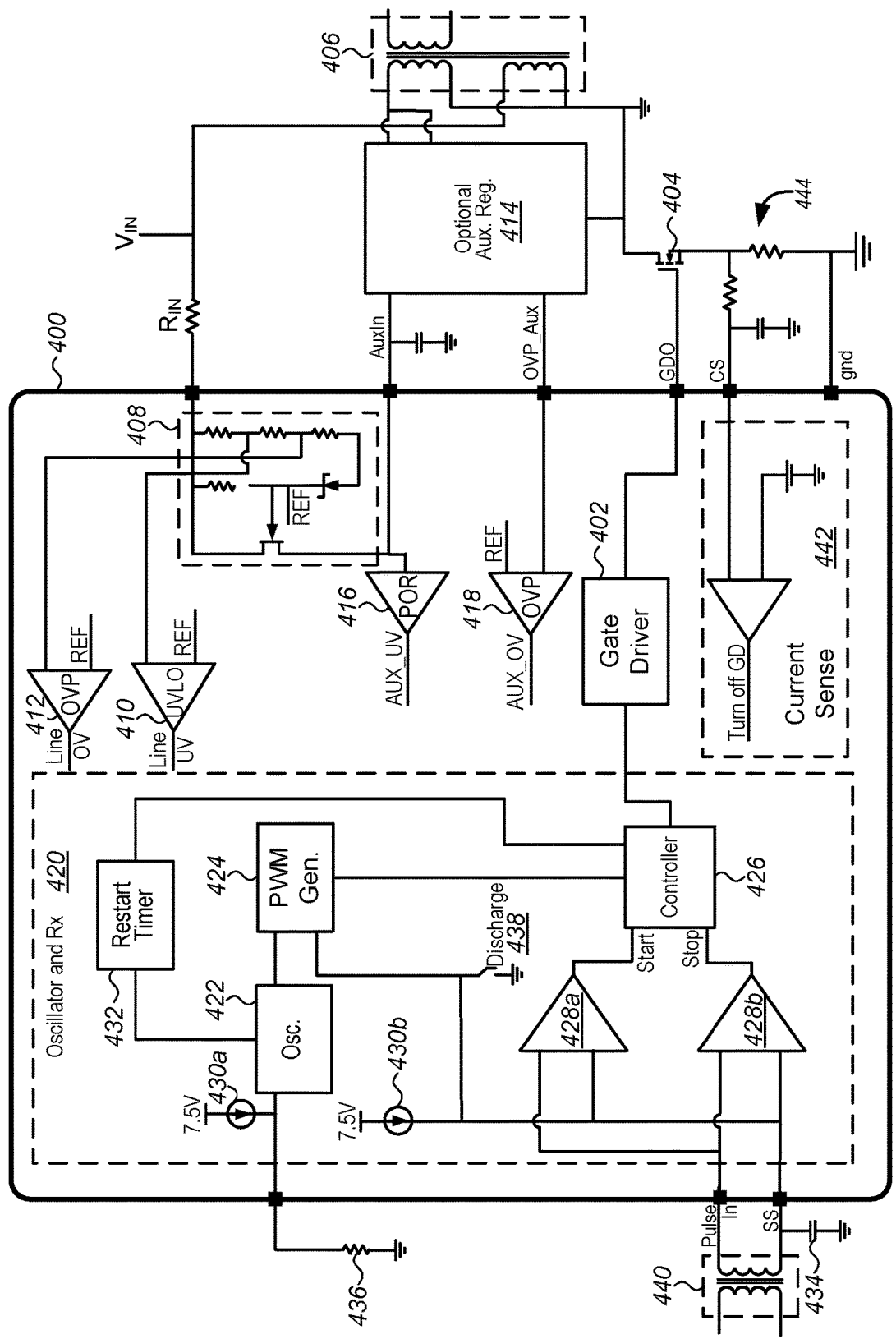
FIG. 4 is a schematic block diagram depicting an embodiment of the PSC of FIG. 3.

A secondary controlled AC-DC converter including an embodiment of a PSC with an independent oscillator will now be described with reference to FIGS. 3 and 4. FIG. 3 is a schematic block diagram illustrating substantially an entire secondary controlled AC-DC converter 300 including a primary-side controller (PSC 302) with an independent oscillator 304. FIG. 4 is a more detailed, schematic block diagram depicting a PSC 400 including an embodiment of an independent oscillator suitable for use in the secondary controlled AC-DC converter 300 of FIG. 3.

Referring to FIG. 3, the AC-DC converter 300 generally includes a flyback transformer 306 having a primary winding (NP) on a primary-side 308 electrically connected or coupled to an AC input, and a secondary winding (NS) on a secondary-side 310 coupled to a DC output.

On the primary-side 308 a rectifying circuit, such as a bridge rectifier 312, and one or more input filters, coupled to a primary winding of the transformer 306 rectify and filter the AC input voltage to supply input power to the primary winding of the transformer. The input filters can include a first input filter 314 having a capacitor (C1) coupled to or across an output of the rectifier 312, and a second, RC filter or snubber 316 including a resistor or resistive element (R2) and a capacitor (C2) coupled in parallel between a first terminal of the primary winding of the transformer 306 and a cathode of a diode or rectifier (D2) having an anode coupled to a second terminal primary winding of the transformer. The AC-DC converter 300 further includes a power switch (PS 318), such as a primary field effect transistor (PR_FET), having a first or drain node coupled to the second terminal of the primary winding of the transformer 306, a second or gate node coupled to a gate-drive output (GDO) pin in the PSC 302, and a third or source node coupled to a current sensing (CS) pin in the PSC and, through a resistive current sensing (RCS) circuit 320 to ground to sense a primary-side current (I_primary) flowing through the primary winding when the PS 318 is closed or conducting.

Generally, the PSC 302 is further coupled to the output of the bridge rectifier 312 through a resistive element (Rin) to provide power to the PSC during a startup phase. Once the startup phase is complete and the line voltage ($V_{IN}$) is within normal operating range, and the PS 318 operates to enable power to be transferred through the flyback transformer 306, an optional/auxiliary regulator 322 coupled to an auxiliary winding of the flyback transformer 306 that is used to supply power to the PSC 302.

On the secondary-side 310 the AC-DC converter 300 includes a filter capacitor 324 and an output capacitor 326 coupled between a first terminal of a secondary winding of the transformer 306 and an electrical ground to provide a DC output voltage to an output interface or connector 328. Generally, as in the embodiment shown the output connector 328 is further coupled to a secondary-side controller (SSC) 330 through a number of communication channels 332 to support various charging protocols. Suitable output connectors 328 can include those compatible with and supporting standard and proprietary charging protocols including Universal Serial Bus Power Delivery USB PD2.0 and USB PD3 with Programmable Power Supply (PPS), Qualcomm® Quick Charge, Samsung® AFC, and Apple® charging protocols. For example, the connector 328 can include a Universal Serial Bus type C (USB-C) compatible connector where the AC-DC converter 300 is compliant with the USB protocol to provide a DC output voltage of about 3.3 VDC to about 21.5 VDC at a current of from about 0 to about 5000 milliamps (mA).

The AC-DC converter 300 further includes on the secondary-side 310 a synchronous rectifier (SR 334), such as a synchronous rectifier field effect transistor (SR_FET), coupled between the second terminal of the secondary winding of the transformer 306 and the ground terminal of the DC output. The SR 334 includes a first or drain node coupled to the transformer 306 and an SRS pin in the SSC 330 to sense a voltage on the drain of the SR; a second or gate node coupled to an SR gate-drive pin to drive or control the SR; and a third or source node coupled to the SSC and the ground terminal of the DC output.

Optionally, as in the embodiment shown, the secondary-side 310 further includes an additional or secondary switch (SS) 336, such as a NFET, coupled between the transformer 306 and the DC output to enable to the SSC 330 to turn off the DC output to protect against over voltage and/or under voltage conditions. The SS 336 includes a source node coupled to a voltage bus in pin ($V_{BUS\_IN}$) of the SSC; a gate node coupled to a voltage bus control pin ($V_{BUS\_CTRL}$) to drive or control the SS; and a drain node coupled to a voltage bus out pin ($V_{BUS\_OUT}$) and to the DC output.

As shown in FIG. 3, the AC-DC converter 300 further includes an isolation circuit or barrier 344 to electrically isolate the secondary-side 310 from the high AC input voltage present on the primary-side 308. Because the transformer 306 is a step down transformer it is generally considered part of the isolation barrier 344. Additionally where, as in the embodiment shown, the AC-DC converter 300 is a flyback converter in which the SSC 330 provides feedback or pulse width modulation (PWM) signal to the PSC 302 from a PWM pin in the SSC, the isolation barrier 344 further includes a pulse edge transformer (PET 346) to couple the PWM signal to a pulse in pin in the PSC. Details of these additional circuits or elements according to various embodiments are described below with reference to FIG. 4.

FIG. 4 is a schematic block diagram depicting an embodiment of the PSC of FIG. 3. Referring to FIG. 4 the PSC 400 includes a gate driver 402 to drive an external primary FET or power switch (PS 404) through a gate-drive output (GDO) to control current flow through the primary-side of a flyback transformer 406.

A $V_{DD}$ pin of PSC 400 is connected to line voltage ($V_{IN}$) either through the bridge rectifier, as shown in FIG. 3, or directly coupled to the AC input using a high-voltage (HV) startup circuit 408. Either implementation will provide power to the PSC 400 during a startup phase. A UVLO block 410 prevents false startup when the $V_{IN}$ is low and keeps the PS 404 OFF. An OVP block 412 shuts the PS 404 OFF when line voltage exceeds a predetermined voltage. Once the line voltage is within normal operating range, the gate driver 402 starts switching the PS 404 and an optional/auxiliary regulator 414 coupled to an auxiliary winding of the flyback transformer 406 is used to supply power to the PSC 400 after the startup phase and no current will be sourced from the $V_{DD}$ pin after startup phase. The voltage on the auxiliary winding is a scaled voltage of the secondary-side voltage. An auxiliary power on reset (POR) block 416 keeps the PS 404 OFF when the power or voltage supplied by the optional/auxiliary regulator 414 is low, and an auxiliary OVP block 418 shuts the PS 404 OFF when the voltage exceeds a predetermined voltage.

The PSC 400 further includes an Oscillator and Receiver (Rx) sub-circuit or block 420 to generate and provide free-running PWM signals to the gate driver 402 to turn on the PS 404 at soft-start when a SSC (not shown in this figure) is not active, and to receive PWM signals from the secondary-side once the SSC becomes active, and couple these signals to the gate driver, while decoupling the free-running PWM signals from the gate-driver.

The Oscillator and Rx block 420 includes an independent oscillator 422 to provide an oscillator signal to a pulse width modulation (PWM) generator 424 to generate and provide free-running PWM signals to the gate driver 402, a controller 426 to select which PWM signals are coupled to the gate driver, and first and second comparators 428a, 428b, through which positive and negative edges of PWM signals from the secondary-side are passed to the controller. The Oscillator and Rx block 420 further includes a number of internal voltage sources (shown in FIG. 4 as exemplary 7.5V sources) and first and second current supplies 430a, 430b to provide reference voltages to the oscillator 422 and the comparators 428a, 428b, and an auto-restart timer 432 coupled to and synchronized with or receiving the oscillator and coupled to the controller 426 to set a predetermined or predefined time for which the PSC 400 operates in open-loop mode before checking for PWM signals from the SSC, and switching to a close-loop mode of operation.

The Oscillator and Rx block 420 supports a soft-start operation by gradually increasing a duty cycle from DCmin to DCmax using an external capacitor 434 connected to an SS pin of the PSC 400 and charged by the internal current source 430b. The duration for the soft-start operation is set by the external capacitor 434 and will depend on a current from the internal current source 430b. A suitable current can include, for example, a current of about 5 μA. Similarly, a maximum amplitude for the soft-start ramp-up is limited to about half the voltage of the internal voltage sources, or about 3.75V, for the embodiment shown in FIG. 4. The oscillator 422 has a frequency (Fosc) that is set by an external resistor 436 connected to a resistor timing (RT) pin of the PSC. Generally, as in the embodiment shown the Oscillator and Rx block 420 includes a discharge path and switch 438 to discharge the external capacitor 434 prior to or following a soft-start operation.

In addition, to generating and coupling free-running PWM signals to the gate driver 402 during soft-start the Oscillator and Rx block 420 receives pulses or PWM signals from the secondary-side controller (SSC) through a PULSE_IN pin when the secondary-side is active. The PWM signals from the secondary-side are coupled to the primary-side using a pulse edge transformer (PET 440). The PET 440 ensures proper frequency response and is selected to have an adequate Q-factor to avoid excessive overshoot. The first comparator 428a detects a positive edge of a pulse from the secondary-side indicating a start of a pulse of the PWM signal, while the second comparator 428b detects a negative edge of a pulse from the secondary-side indicating a stop or end of the pulse of PWM signal. In response to these start and stop signals received from the first and second comparators 428a, 428b, the controller 426 couples the PWM signal from the secondary-side to the gate driver 402, while simultaneously or concurrently decoupling the free-running PWM signals from the gate driver, thereby placing the AC-DC converter in a close-loop mode of operation.

In some embodiments, such as that shown, the PSC 400 can further include a current sense block 442 to detect an over-current condition due to large current flowing from the flyback transformer 406. The current sense block 442 provides pulse-by-pulse protection when the voltage on a current sense (CS) pin exceeds voltage threshold ($V_{CSTH}$) sensed using and an external resistive current sensing (RCS) circuit 444 coupled to a primary-side of flyback transformer 406, and limits the current on the primary-side by turning OFF the PS 404. In open-loop mode, if the voltage CS pin exceeds $V_{CSTH}$, the PSC 400 can restart in soft-start mode after the auto-restart timer 432 has timed out. In close-loop mode, PS 404 turns ON again when the next pulse is received from the secondary-side.

Figure 5:
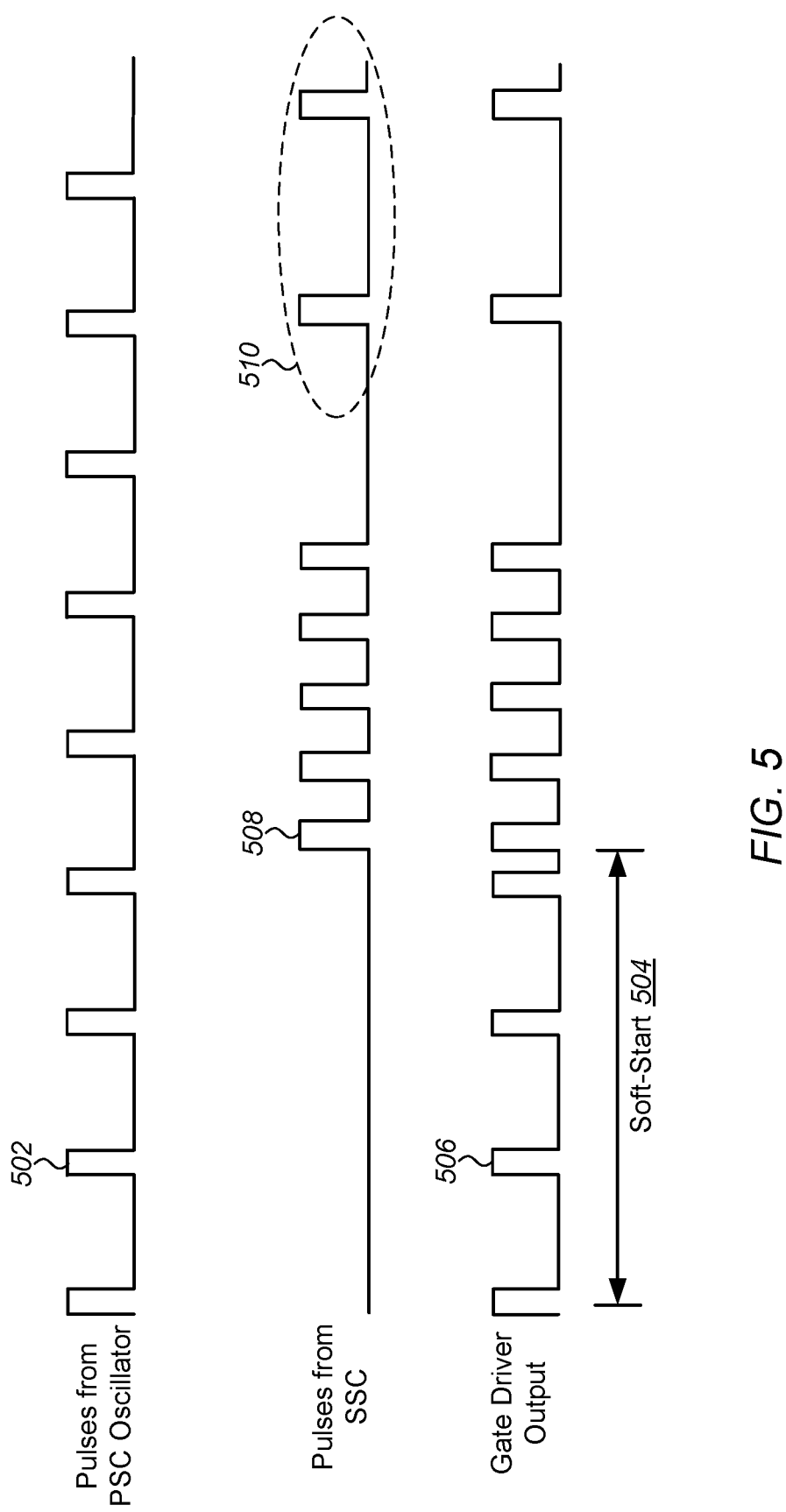
FIG. 5 are timing diagrams showing waveforms of critical signals from the PSC of FIG. 4 operating in an open-loop mode using a signal originating from the independent oscillator, and in a close-loop mode using a signal from a SSC.

FIG. 5 illustrates timing diagrams showing waveforms of critical signals from the PSC of FIG. 4 operating in an open-loop mode using a signal originating the free-running independent oscillator 422 Referring to FIG. 5, waveform illustrates the signals or pulses 502 produced from the free-running independent oscillator 422 in the PSC 400. It is noted that the pulses have a substantially uniform or constant frequency. In some embodiments the frequency of the pulses 502 is selected to enable operation of the elements in the PSC 400, including the controller, using the pulses 502 or signals from oscillator signal as a clock signal. During a soft-start period 504 or mode of operation, pulses 502 produced from signals from the oscillator are used to operate a gate-driver (GD) 402, to generate a gate-driver output (GDO 506) to drive the power switch (PS 404) enabling the secondary controlled AC-DC converter to begin producing power on the secondary-side and powering up the SSC in an open-loop mode. Once the SSC is powered up and begins generating a feedback (FB) signal or a series of start and stop pulses, which trigger the leading and trailing edges of PWM signals 508, from the SSC indicating the AC-DC converter should begin PWM using the start and stop pulses from the SSC to begin and end each PWM pulse, the controller in the PSC 400, decouples the pulses 502 produced from the oscillator signal from the gate-driver 402 and couples the FB or PWM signal to the gate-driver to generate the GD signal driving the PS in a close-loop mode. As noted above, an advantage of this PSC 400 is that the independent oscillator 422 in the PSC continues to operate at a fixed frequency, generating clock signals to operate logic elements in the PSC, such as in the controller 426.

An additional, advantage of the PSC 400 is that even when due to a low demand for power on the secondary-side of the AC-DC converter 300 the frequency of pulses 508 received from the SSC falls below the fixed frequency of the independent oscillator 422 as indicated by ellipse 510, GDO 506 continues to follow the lower frequency pulses 508 from the SSC, thereby enabling the gate-driver 402 to operate at a lower frequency than the fixed frequency of the independent oscillator, and to operate more efficiently. This saves significant power, particularly when the AC-DC converter 300 is in a standby mode of operation.

Figure 6:
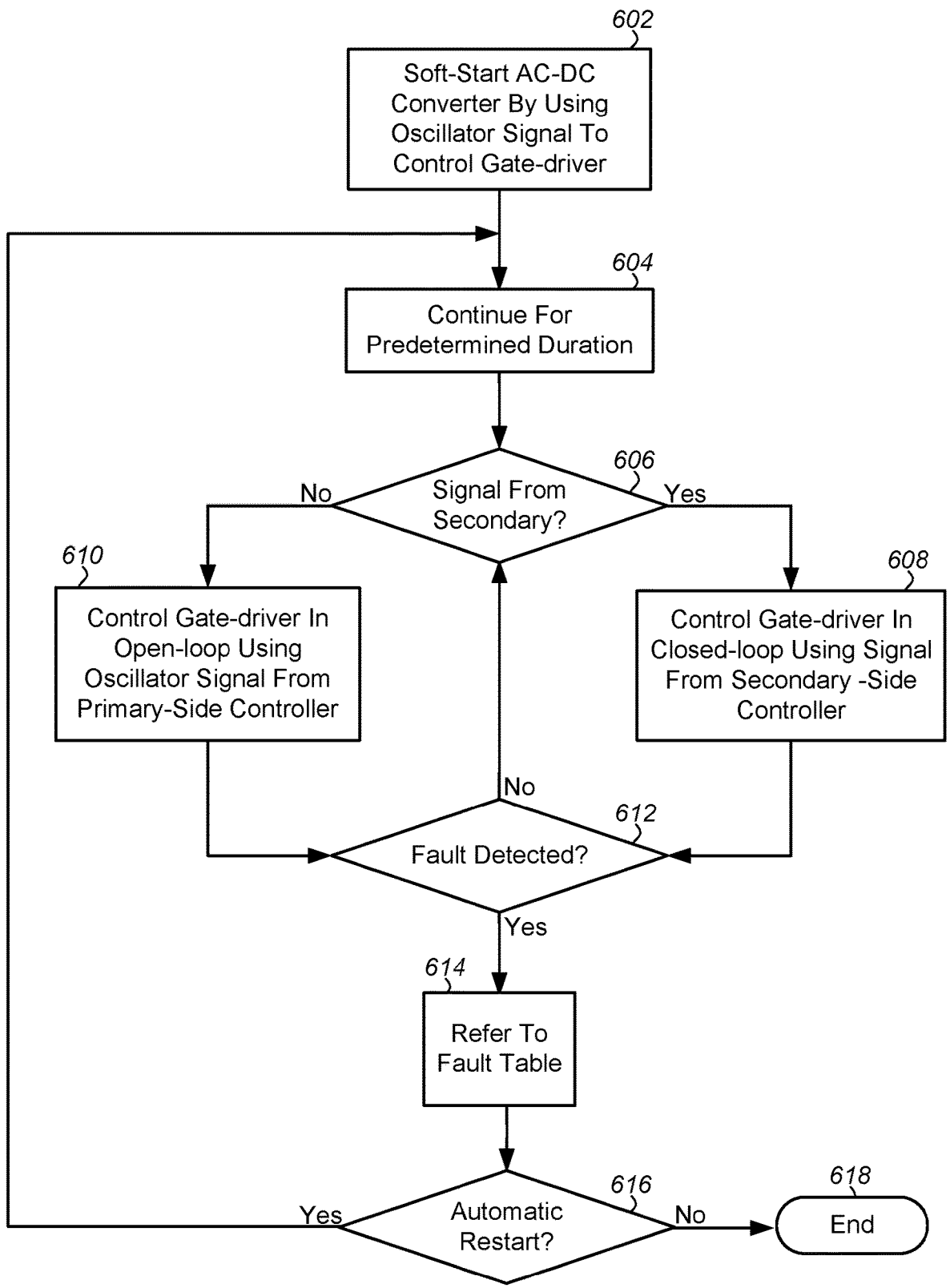
FIG. 6 is a flowchart illustrating an embodiment of a method for operating a secondary controlled AC-DC converter in an open-loop mode using a signal originating from an independent oscillator in a PSC, and in a close-loop mode using a signal from a SSC.

An embodiment of a method for operating a secondary controlled AC-DC converter in an open-loop mode using a signal originating from an independent oscillator in a PSC, and in a close-loop mode using a signal from a SSC will now be described with reference to the flowchart of FIG. 6. Referring to FIG. 6 the method begins with a soft-start of the AC-DC converter using an oscillator signal from a free-running, independent oscillator in the PSC to control a gate-driver (602). As noted above, generally this step includes using the oscillator signal as a clock signal to operate elements in the PSC including logic elements or gates in the controller. This open-loop mode operation continues for a predetermined duration (604). The predetermined duration is based on both a time required for the SSC to power up and begin producing a pulse-width-modulated (PWM) signal, and a minimum duration or time that is set by a timer or a number of elements having a predetermined fixed delay, such as a number of buffers including in logic elements or gates of the PSC. Once the predetermined duration has passed, the logic elements or gates of the PSC check to determine if a feedback (FB) or PWM signal is received in the PSC from the SSC (606). If the FB or PWM signal has been received, the GD is controlled or operated in a closed-loop mode using the signal from SSC (608). Additionally, the oscillator signal is decoupled from the GD signal using controller in the PSC. If the FB or PWM signal has not been received, the GD continues to be controlled or operated in the open-loop mode using the signal originating from an independent oscillator in a PSC (610). Next, a fault check is performed to determine if any signals indicating one of a number of predefined faults have been detected in operation of the AC-DC converter (612). If no fault is detected, and the FB or PWM signal continues to be received from the SSC (step 606), the secondary controlled AC-DC converter continues to operate in the close-loop, post soft-start mode using the signal from SSC (step 608). If no fault is detected, and the FB or PWM signal has not been received from the SSC (step 606), the secondary controlled AC-DC converter continues to operate in the open-loop, soft-start mode using the signal from the independent oscillator in the PSC (step 610). However, if a fault has been detected the PSD consults a fault table (614) and determines if an automatically restarting or auto-restart is indicated (616). Table I below summarizes fault conditions for which an automatic restart is indicated. If a restart is indicated open-loop mode operation is resumed for the predetermined duration (step 604). However, if a restart is not indicated, that is a restart would not clear the fault condition, the GDO signal to the GD is withdrawn, and power conversion is terminated (618).

TABLE I

| Fault | Action |
| --- | --- |
| VIN low; Gate-Driver output is low | Perform auto-restart |
| VIN high; Gate-Driver output is low | Perform auto-restart |
| OVP_Aux pin exceeds over-voltage protection threshold in open-loop mode | Perform auto-restart |
| CS_pin exceeds current-sense threshold in open-loop mode | Perform auto-restart |
| CS_pin exceeds threshold in close-loop mode | Wait for next pulse from SSC |
| Stop command received from SSC | Shutdown |
| Receive no pulses for SSC after auto-restart timer times out | Perform auto-restart |

TABLE I-continued

| Fault | Action |
| --- | --- |
| Start pulse and no stop pulse received from SSC | Keep gate-driver on for 25 µs, wait for auto-restart timer to time out and perform auto-restart |

Figure 7:
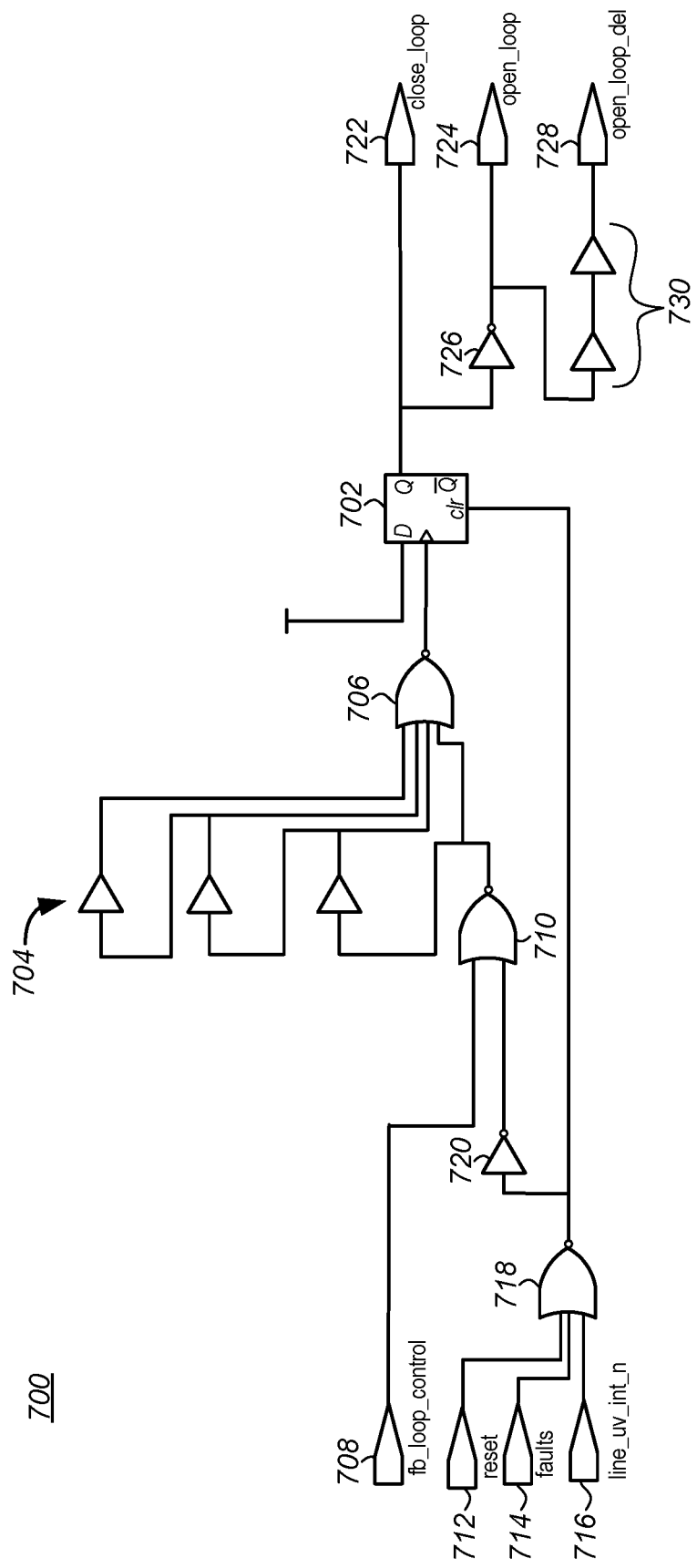
FIG. 7 is logic gate diagram of a portion of the PSC illustrating an embodiment of a logic circuit to determine if the PSC should be operating in open-loop or close-loop mode.

FIG. 7 is logic gate diagram of a portion of the PSC illustrating an embodiment of a logic circuit 700 to determine if the PSC should be operating in open-loop or close-loop mode. The purpose of this logic circuit is to determine if the PSC should be in close or open loop mode.

Upon reset or detection of any fault this logic will result in the PSC operating in an open-loop mode. The logic circuit only transitions the PSC to a close-loop mode when all faults are removed, and a FB or PWM signal is received from the SSC. The setting and resetting of this loop controller circuit is asynchronous. That is any faults will prevent latch 702 from being set. As result the removal of a reset condition and the FB or PWM signal may create a short glitch to a clock input of the latch 702. To create a wider pulse and prevent this glitch from latching the latching 702, a stack of buffers 704 are included as inputs to a first NOR gate 706 couple to an input of the latch 702. Referring to FIG. 7, in operation the logic circuit 700 receives a signal on an FB_loop_control input 708 that a FB or PWM signal from the SSC has been received in the PSC. This signal is coupled to a second NOR gate 710 in the logic circuit 700. Simultaneously or concurrently the logic circuit 700 checks for or determines that no reset signal 712, fault detected signal 714 or line under voltage (UV) detected signal 716 has been received on a third NOR gate 718. If any of these three signals has been received, the third NOR gate 718 passes a signal to the latch 702 preventing the AC-DC converter from operating in close-loop mode, and placing the PSC in open-loop mode.

If none of the three signals has been received the third NOR gate 718 passes a signal through an inverter 720 to the second NOR gate 710, and, if the appropriate signal has been received from the FB_loop_control input 708, the second NOR gate passes a signal to the first NOR gate 706, causing the latch 702 to latch a close-signal to a close-loop_output 722. If however a FB signal has not been received on the FB_loop_control input 708, the latch 702 outputs an open-loop signal to an open-loop_output 724 through an inverter 726, and to an open-loop_delay_output 728 through one or more buffers 730.

Figure 8:
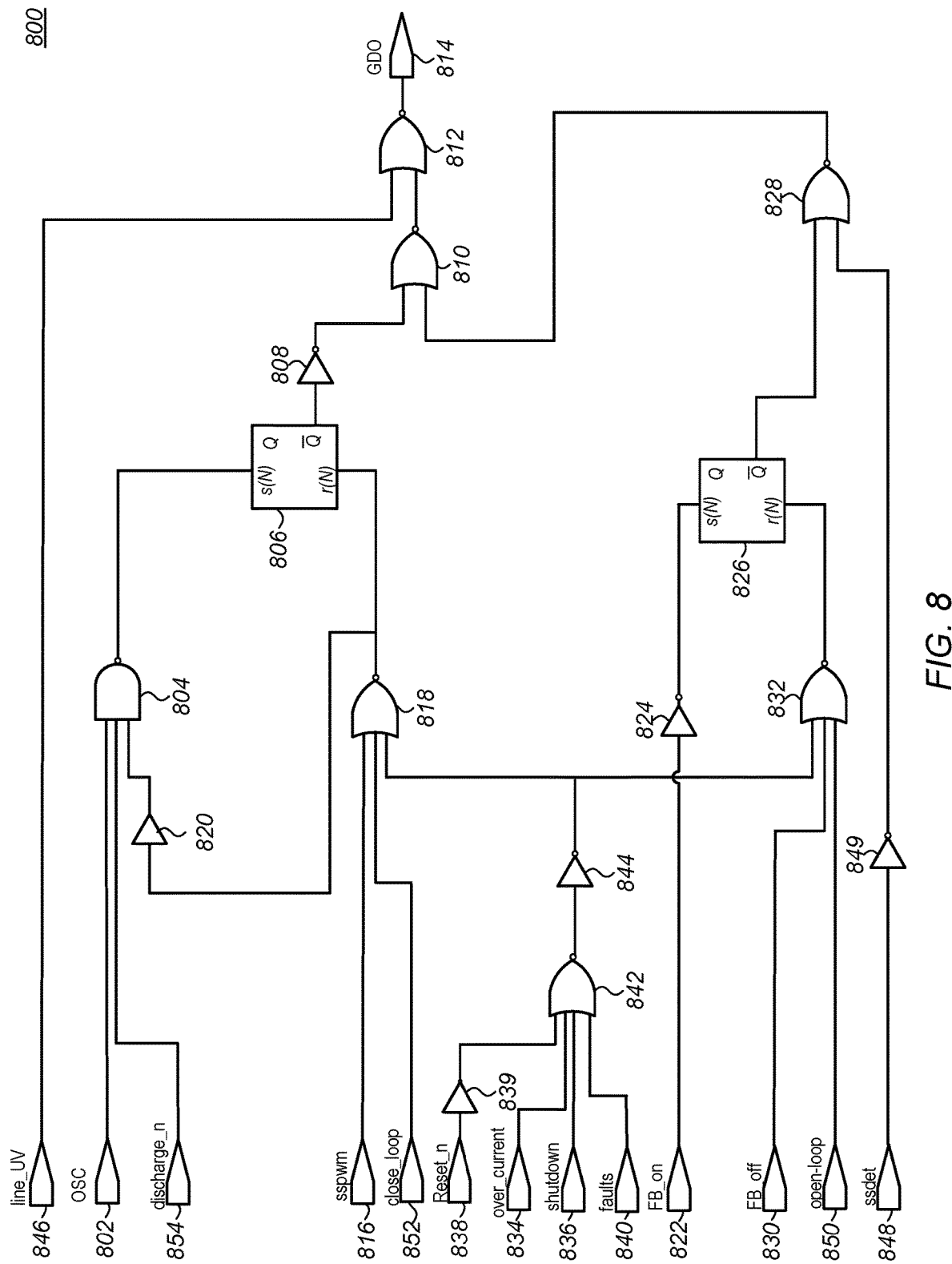
FIG. 8 is logic gate diagram of a portion of the PSC illustrating an embodiment for a gate-drive output (GDO) control.

FIG. 8 is logic gate diagram of a portion of the PSC illustrating an embodiment for a gate-drive output (GDO) control circuit 800. Referring to FIG. 8 when in open-loop mode, an high oscillator input (osc_input 802) is applied to AND gate 804 to set a flip-flop or latch 806, and through an inverter 808 and NOR gates 810 and 812 to provide the GDO (GDO_output 814) to drive the power switch or primary FET (not shown in this figure). When a PWM signal from the SSC is detected on sspwm-input 816 the signal is applied through NOR gate 818 to reset latch 806, and through buffer 820 to AND gate 804 to decouple the osc_input 802 from the GDO_output 814. When in close-loop mode, a high feedback on input (fb_on 822) is applied through an inverter 824 to set a second flip-flop or latch 826, and to provide the GDO_output 814 through NOR gates 828, 810 and 812. When a high feedback off signal (fb_off 830) is applied through NOR gate 832, the latch 826 is reset, removing the fb_on 822 from the GDO_output 814. Any fault, such as an over current input (over_current 834), a shutdown signal (shutdown_on 836), a reset signal 838 applied through buffer 839 or any other fault 840, such as one of those listed in Table I, applied through NOR gate 842 and inverter 844, will cause the latch 826 to reset removing the fb_on 822 from the GDO_output 814. Additionally, a line under voltage signal (line_uv 846) applied through NOR gate 812 will turn off the GDO_output 814 after 32 millisecond (ms) debounce from a falling edge the signal, and in close-loop mode, if a secondary-side detect signal (ssdet 848) is lowered and coupled to NOR gate 828 through inverter 849, the GDO_output 814 will turn off. Finally, signals to an open_loop input 850 or a close_loop input 852, either from a user or other logic elements in the PSC, will cause the PSC to operate in open-loop or close-loop mode respectively. Finally, a signal applied to a discharge input (discharge_n 854) prior to or following a soft-start operation will indicate the external capacitor 434 (not shown) has been discharged and the soft start period has begun. Conversely, a high input on the discharge_n 854 will indicate the duration set for the soft-start operation is complete.

Thus, a secondary controlled AC-DC converter including an independent oscillator and controller to switch between an open-loop mode of operation using a gate-drive signal originating from the independent oscillator, and close-loop mode using pulse width modulation (PWM) from a secondary-side controller, and methods for operating the same have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:
1. A method of operating an AC-DC converter, the method comprising:
driving a power switch (PS) coupled between an AC input and a primary-side of flyback transformer with a gate- drive (GD) signal generated using an oscillator signal from an oscillator in a primary-side controller;

receiving in the primary-side controller a pulse-width-modulated (PWM) signal from a secondary-side controller coupled to a secondary-side of the AC-DC converter; and decoupling the oscillator signal from the GD signal using a controller in the primary-side controller, and using the PWM signal to generate the GD signal driving the PS, wherein the oscillator operates at a first frequency independent of the PWM signal, and wherein the PWM signal is generated at one of a number of second frequencies selected by the secondary-side controller based on a power drawn from the secondary-side of the AC-DC converter.

2. The method of claim 1 further comprising using the oscillator signal as a clock signal to operate elements in the primary-side controller.

3. The method of claim 2 wherein the first frequency is a constant frequency based on the elements in the primary-side controller using the oscillator signal as the clock signal.

4. The method of claim 1 wherein the second frequency is lower than the first frequency.

5. A method of operating a primary-side controller of an AC-DC converter, the method comprising:

operating the AC-DC converter in an open-loop mode by driving a power switch (PS) coupled between an AC input and a primary-side of the AC-DC converter with a gate-drive (GD) signal generated using an oscillator signal from an oscillator in the primary-side controller;

receiving in the primary-side controller a feedback (FB) signal from a secondary-side controller coupled to a secondary-side of the AC-DC converter; and operating the AC-DC converter in a close-loop mode by decoupling the oscillator signal from the GD signal using a controller in the primary-side controller, and using the FB signal to generate the GD signal driving the PS, wherein the oscillator operates at a first frequency independent of the FB signal, wherein the FB signal is generated by the secondary-side controller at a second frequency independent of the first frequency, and wherein the second frequency comprises one of a number of frequencies selected by the secondary-side controller based on a power drawn from the secondary-side of the AC-DC converter.

6. The method of claim 5 further comprising upon detecting one of a number of predefined faults in operation of the AC-DC converter, automatically restarting the AC-DC converter by operating the AC-DC converter in the open-loop mode until the FB signal is received in the primary-side controller and then operating the AC-DC converter in close-loop mode.

7. The method of claim 6 wherein the number of predefined faults include:

a voltage-in exceeds predetermined high or low voltage;

the GD signal is below a predetermined minimum voltage;

a voltage from an auxiliary regulator on the primary-side exceeds over-voltage protection threshold in open-loop mode;

a current on the primary-side exceeds a current-sense threshold;

a stop command received from a secondary-side controller (SSC);

no start or stop pulse received from the SSC after predetermined time; and a start pulse and no stop pulse received from the SSC.

8. The method of claim 5 wherein further comprising using the oscillator signal as a clock signal to operate elements in the primary-side controller.

9. The method of claim 8 wherein the first frequency is a constant frequency based on the elements in the primary-side controller using the oscillator signal as a clock signal.

10. The method of claim 5 wherein the second frequency is lower than the first frequency.

11. A primary-side controller for an AC-DC converter, the primary-side controller comprising:

an oscillator to supply an oscillator signal to a gate-driver in the AC-DC converter, the gate-driver to generate a gate-drive (GD) signal to drive a power switch (PS) coupled between an AC input and a primary-side of the AC-DC converter; and a controller in the primary-side controller coupled to receive a feedback (FB) signal from a secondary-side controller in a secondary-side of the AC-DC converter, the controller configured to, on receiving the FB signal, decouple the oscillator signal from the gate-driver and couple the FB signal to the gate-driver to generate the GD signal driving the PS, wherein the oscillator operates at a first frequency independent of the FB signal, wherein the FB signal is generated at a second frequency comprising one of a number of frequencies automatically selected based on a power drawn from the secondary-side of the AC-DC converter, and wherein the first frequency at which the oscillator operates is independent of the second frequency of the FB signal.

12. The primary-side controller of claim 11 wherein the oscillator further supplies the oscillator signal to elements in the controller as a clock signal to operate the elements.

13. The primary-side controller of claim 12 wherein the first frequency is a constant frequency based on the elements in the controller using the oscillator signal as a clock signal.

14. The primary-side controller of claim 11 wherein the second frequency is lower than the first frequency.

* * * * *